Patented Mar. 29, 1938

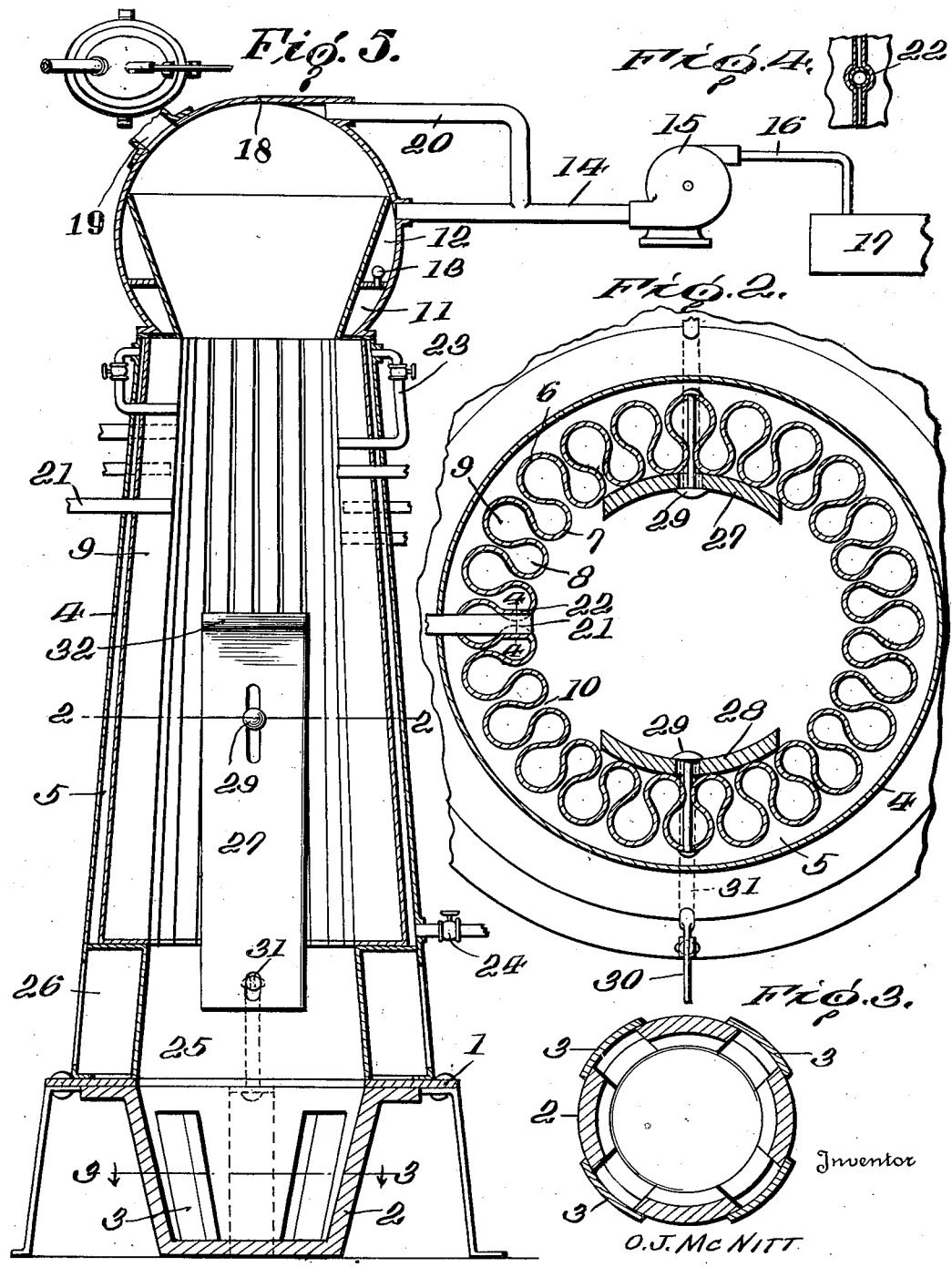

2,112,502

UNITED STATES PATENT OFFICE 2,112,502

APPARATUS FOR MANUFACTURING LIME AND CEMENT AND COLLECTING CARBON DIOXIDE DELIVERED THEREFROM

Ogleby James McNitt, Miami, Fla.

Application October 6, 1936, Serial No. 104,258

8 Claims. (Cl. 263—29)

This invention relates to certain new and useful improvements in an apparatus for and a method of burning carbonates to produce lime and cement and has for its main object the production of a kiln so constructed that the gases delivered from the burning of the carbonates are allowed to escape through a plurality of vertically disposed, parallel arranged, flues.

Another object of my invention is to provide a kiln so constructed that the calcining of the carbonates or other material can be accomplished with artificial or natural gases or electricity, but I have found that butane and propane gases are especially adapted for use in my particular construction of kiln.

A still further object of my invention is to provide a kiln with a water jacket so constructed that the inner wall of the jacket is formed with a plurality of alternately arranged vertically disposed water passages and gas flues, means being provided for utilizing the steam generated in the water jacket for aiding combustion and purifying the escaping carbon dioxide gases.

Another object of the invention is to provide means for agitating the material being calcined to allow the same to pass freely through the kiln from the charging spout to the delivery pit, whereby I am able to pass the material rapidly through the kiln so as to produce lime or cement in a smaller size kiln without reducing the capacity of the same.

Another object of my invention is to provide the inner wall of the kiln with a plurality of laterally extending continuous gas outlets into the vertically disposed gas flues whereby any excess pressure of gases is compensated for.

Other and further objects and advantages of the invention will be hereinafter set forth and the novel features thereof defined by the appended claims.

In the drawing,

Figure 1 is a vertical section through a kiln constructed in accordance with my invention showing a suction fan and the carbon dioxide collecting apparatus in elevation;

Figure 2 is an enlarged horizontal section taken on line 2—2 of Figure 1;

Figure 3 is a section taken on line 3—3 through the delivery pit of the kiln;

Figure 4 is a detail section taken on line 4—4 of Figure 2, and

Figure 5 is a modified form of kiln.

In the embodiment of my invention as herein shown in the drawing, 1 indicates a base of the kiln under which is arranged a delivery pit 2 provided with a plurality of delivery openings through which the lime or cement is removed, said openings being closed by doors 3.

Mounted on the base 1 is a tapering cylindrical or conical shell 4 forming the outer wall of a water jacket 5, the inner wall being tapered to correspond to the taper of the outer wall in order to form a kiln with a burning chamber which gradually increases in cross sectional area from the top to the bottom. The inner wall is corrugated or formed by a plurality of oppositely arranged loops 6 and 7 which form a plurality of water passages 8 and gas flues 9, the loops being slightly spaced apart as shown at 10 to allow the gases from the combustion chamber of the flue to pass into the gas flues 9 to relieve the pressure thereof and these gas flues 9 communicate at their upper ends with a gas chamber 11 which is in communication with gas chamber 12 through a valve controlled opening 13. The chamber 12 is provided with an outlet pipe 14 connected to a suction fan 15 which delivers the gases through a pipe 16 to a carbon dioxide collecting apparatus 17 and I do not wish to limit myself to any particular construction of carbon dioxide collecting apparatus as I am aware that various constructions can be used without departing from the spirit of my invention, but I have found in practice by the use of a particular kind of gas or electricity, the carbon dioxide gas will require little, if any, refining.

The inner wall of the gas chambers 11 and 12 is conical in shape to facilitate the feeding of the material into the upper end of the combustion chamber of the kiln and is enclosed by a dome 18 which is provided with a charging spout 19 through which the material is delivered. The dome is provided with an outlet pipe 20 connected to the pipe 14 of the suction blower so that all of the gases which do not pass into the vertically disposed flues are drawn out of the dome and delivered into the carbon dioxide collecting apparatus.

Extending through the water jacket are a plurality of gas burners 21 which are preferably staggeredly arranged and as shown in the embodiment of the invention illustrated, these burners extend through the vertical gas flues and between the water passages which are bent as shown at 22 to conform to the shape of the burners, which burners preferably are arranged flush with the inner wall of the combustion chamber of the flue so as to prevent the same from retarding the flow of the material therethrough by gravity.

While in the drawing I have shown burners especially adapted for the use of these butane and propane gases, I do not wish to limit myself to the use of any particular kind of burner or any particular number of burners as I am aware that the style and number of burners can be increased or decreased to increase or decrease the combustion within the combustion chamber of the kiln.

The upper end of the water jacket is provided with valve controlled steam outlet pipes which deliver steam into the combustion chamber of the flue above the burners so as to reduce the gas pressure and purify the gases and to aid the combustion and by having these outlet pipes at the upper end of the water jacket and delivering into the combustion chamber, either water or steam can be delivered into the combustion chamber of the flue and by having the same valve controlled, the amount of steam and water can be regulated.

The water jacket is provided with a valve controlled inlet pipe 24 at its lower end through which the water jacket is filled and maintained at the proper level whereby I am able to manufacture a kiln of any suitable kind of metal to keep the same cool or at such a temperature that the metal from which it is formed will not be affected by the intense heat.

In the embodiment of the invention as herein shown, a cooling chamber 25 is formed at the lower end of the combustion chamber of the kiln above the delivery pit 2 and said cooling chamber is surrounded by an annular air chamber 26 provided with suitable air inlets through which air can pass so as to cool the walls of the chamber.

In order to agitate the material being calcined in the kiln, I provide vertically disposed agitators 27 and 28 oppositely disposed having suitable slots through which bolts 29 pass for guiding the agitators in their vertical movement. These agitators are adapted to be reciprocated up and down within the combustion chamber by bell crank levers 30, one of which being disposed on each side of the kiln and extending through the air and cooling chamber into slots 31 formed in the lower end of the agitators 27 and 28 and while in the drawing I have only shown one of these bell cranks for reciprocating the agitators, as they are formed exactly alike, the description of one will be sufficient for both as these agitators are formed exactly alike and are curved crosswise to conform to the inner curvature of the wall of the kiln and are provided with beveled upper ends 32 so as to scrape the walls free from any material which is adhering thereto in its passage through the kiln.

While in the drawing I have shown a cylindrical kiln, it is, of course, understood that this kiln could be constructed oval as shown in Figure 5 without departing from the spirit of my invention for I have found in practice that better results are obtained by forming the combustion chamber substantially of the shape of a truncated cone with the small end disposed at the top and the larger at the bottom so as to hasten the travel of the material being operated on through the kiln, as with my construction I am able to manufacture a kiln of a very small size and produce lime or cement in the same time that it is now required to produce lime and cement in a large kiln and at the same time I am able to collect and utilize as a by-product carbon dioxide gas escaping from the kiln in the burning of the carbonates in producing lime and cement.

While I have shown a method and apparatus of a particular construction for the manufacture of lime and cement and the collection of carbon dioxide gases for commercial purposes, I wish to have it clearly understood that I do not wish to limit myself to the particular design of kiln herein shown and described as my invention consists in providing a kiln with a combustion chamber surrounded by a water jacket having a plurality of alternately arranged water flues and gas flues, the latter being in communication with the combustion chamber through restricted passages to relieve the excessive pressure and to increase the calcining of the material passing through the kiln.

From the foregoing description it will be seen that I have provided a novel construction of apparatus for calcining carbonates or any other kind of material in the manufacture of lime and cement whereby I am not only able to reduce the time required for calcining the material being operated on, but I am able to collect the gases to be used for commercial purposes.

What I claim is:

1. An apparatus for burning carbonate material comprising an upright tapering shaft, said shaft being provided with a water jacket having a plurality of gas flues in communication with the shaft throughout their lengths through restricted passages, means for charging the material in the top of the shaft, means for discharging the burnt material from the bottom of the shaft and means for applying heat to the material in its passage through the shaft.

2. A kiln of the kind described having a vertically disposed tapering shaft surrounded by a water jacket having a corrugated inner wall to provide alternately arranged vertically disposed water passages and gas flues, said gas flues being continuously in communication with the shaft of the kiln through restricted passages and adapted to receive the gases discharged in the burning of the carbonate material passing therethrough and means for burning the material passing through said shaft.

3. An apparatus for burning carbonate material comprising an upright shaft kiln having a water jacket surrounding the same formed with a corrugated inner wall to provide vertically disposed water passages and gas flues substantially circular in cross section, a plurality of burners extending to said shaft and means for delivering steam or water from said water jacket into said shaft above the burners.

4. An apparatus for burning carbonate material comprising a vertically disposed kiln having a vertically disposed shaft surrounded by spaced metal walls, the inner wall being corrugated to form a plurality of spaced vertically disposed parallel, substantially circular gas flues and cooling passages, the gas flues being in communication with the shaft throughout their lengths through restricted passages between the cooling passages.

5. An apparatus for burning carbonate material comprising an upright tapering metal shaft having spaced metal walls, the inner wall being corrugated to form a plurality of alternately arranged gas flues and cooling flues, the gas flues being in communication with the shaft throughout their lengths through restricted passages, means for charging the material at the top of the shaft, means for discharging the burnt material from the bottom of the shaft and a plurality of means for applying heat to the material in its passage through the shaft.

6. A kiln of the kind described having a vertically disposed tapering shaft having spaced metal walls, the inner wall being corrugated to provide alternately arranged vertically disposed, substantially circular cooling passages and gas flues, said gas flues being continuously in communication with the shaft of the kiln through restricted passages between the cooling passages and adapted to receive the gases discharged in the burning of the carbonate material passing therethrough and means for burning the material passing through said shaft.

7. An apparatus for burning carbonate material comprising an upright shaft formed with spaced metal walls, the inner wall being corrugated to provide vertically disposed alternately arranged cooling passages and gas flues substantially circular in cross section and a plurality of burners extending through the cooling passages into the shaft.

8. A kiln of the kind described having a vertically disposed shaft having spaced metal walls, the inner wall corrugated to form oppositely arranged loops slightly spaced apart to provide cooling passages and gas flues, the gas flues being in communication with the shaft throughout their lengths through restricted passages and the cooling passages being in communication with the cooling medium throughout their lengths through restricted passages.

OGLEBY JAMES McNITT.